Patented June 16, 1936

2,044,674

UNITED STATES PATENT OFFICE 2,044,674

PRODUCTION OF FINELY DISTRIBUTED COPPER COMPOUNDS

Frederick Charles Elphick and James Ramsay Gray, Silvertown, London, England, assignors of one-third to Burt, Boulton & Haywood Limited, London, England, a British company No Drawing. Application March 5, 1934, Serial No. 714,202. In Great Britain March 8, 1933

5 Claims. (Cl. 167—16)

The object of the present invention is to provide a method of manufacturing in a concentrated paste form various copper compounds in a fine state of distribution or division, such as is required for the adequate and efficient control of various fungus diseases which occur on many plants, particularly hops, vines and fruit trees.

One known method of producing fungicidal metal compounds in a so-called colloidal state consists in making the compound by double decomposition in a solution containing a colloid and then separating the soluble salt which has been formed by the double decomposition. It appears to have been considered that removal of the colloid together with the soluble salt was destructive of the capacity of the metal compound to remain suspended in water to constitute a spraying liquor, because the methods of removing the soluble salt were confined to dialysis (or, in the case of colloids which form a gel, the washing of the jelly) and precipitation of the colloid together with the metal compound, such as by addition of alcohol.

The present invention is based on the observation that the usefulness of the so-called colloidal metal compound in respect of its capacity for forming a suspension in water is not depreciated by washing away the colloid together with the soluble salt. Thus the invention saves the tedious or costly process of dialysis or precipitating and washing with alcohol, and produces a product substantially free from colloid and electrolyte.

According to the present invention a copper salt is dissolved in water containing a colloid and there is added a solution of ions which form with the copper ions present, a compound insoluble in the mixture and therefore forming a precipitate therein; alternatively a solution of the copper salt may be added to the solution containing the said ions and the colloid, or vice versa.

Examples of suitable colloids are gum, casein in alkaline solution, waste sulphite cellulose liquor, gelatin, and saponin, or a mixture of any of these. As precipitants of copper compounds may be used soluble salts which exchange radicals with soluble copper salts to give insoluble copper compounds, such as alkali salts of inorganic acids, for example alkali carbonates, bicarbonates, arsenites, borates, ferrocyanides or silicates.

Alkali salts of organic acids may also be used, for example oxalates, or salts of certain fatty acids or rosin acids.

Instead of a soluble salt, there may be used a suitable base, such as an alkali hydroxide, an alkaline earth oxide or hydroxide, or ammonium hydroxide, to form hydroxides, or to form basic salts, such as the basic sulphate or basic chloride.

The precipitated copper compound is washed and the water is removed from it until it contains the desired percentage of copper in the form of the compound. In this condition, small quantities of an alkali, or alkali carbonate, or a mixture of these substances may be added by any simple process of mixing.

The prepared copper compound will then, when well mixed with water remain long in suspension and does not lose this property even when dry.

The following examples illustrate the invention:—

Example 1

To a solution of 250 grams of copper sulphate ($CuSO_4.5H_2O$) in 3 litres of water containing 150 grams of concentrated sulphite cellulose lye is added a solution of 400 grams of crystallized borax in 4 litres of water. The addition is made gradually with mixing. If sufficient borate has not been added to convert the copper completely into the insoluble copper borate, further small quantities may be added until the conversion is complete. The mixture is allowed to settle for a day or two, the supernatant liquor is removed, and the deposit is washed by decantation until substantially the whole of the alkali sulphate has been removed; finally, the copper compound is filtered and the water allowed to drain from it or removed by suction, until the mass contains about 10–15 per cent. of copper in the form of a borate.

The moist compound is mixed with a solution of 25 grams of $Na_2CO_3$ in 60 cc. of water and marketed in this condition.

Example 2

The procedure is the same as in Example 1, except that instead of the 150 grams of concentrated sulphite cellulose lye, there is used a solution of 100 grams of casein in 2000 cc. of aqueous caustic soda solution containing 225 grams of NaOH. When the product is finally filtered there may be mixed with it a solution of 40 grams of $Na_2CO_3$ in 100 cc. of water.

Example 3

To a solution of 80 grams of copper sulphate ($CuSO_4.5H_2O$) in 3 litres of water containing 80 grams of gum arabic there is added, while stirring well, an aqueous solution of sodium carbonate of 10 per cent. strength until precipitation of the copper in the form of a basic carbonate is complete. The precipitate is washed, filtered, allowed to drain, further concentrated by suction, and finally mixed with sodium carbonate as prescribed in Example 1.

Having thus fully described the nature of the said invention and the best means we know for carrying the same into practical effect, we claim:—

1. The process of producing colloidal cupric compounds which comprises mixing a solution of a cupric salt containing a colloid with a solution of a soluble salt which exchanges radicals with soluble cupric salts to give insoluble cupric compounds, washing the precipitate thus produced, concentrating it by removing water from it, and finally peptizing it by mixing it in moist condition with a material selected from the group consisting of an alkali carbonate and an alkali hydroxide.

2. A fungicide consisting of an aqueous colloidal paste of a cupric compound which is peptized by the presence of a small proportion of an alkali, said paste being miscible with water to form a durable suspension.

3. A fungicide consisting of an aqueous colloidal paste of cupric borate which is peptized by the presence of a small proportion of an alkali, said paste being miscible with water to form a durable suspension.

4. A fungicide base comprising a cupric compound in finely divided paste-like form, said compound being substantially insoluble and substantially free from electrolytes and colloids, but being peptizable with an alkali to form a colloidal paste which is miscible in water to form a durable suspension.

5. The fungicide base described in claim 4, wherein said cupric compound comprises cupric borate.

FREDERICK CHARLES ELPHICK.
JAMES RAMSAY GRAY.